(12) United States Patent
Liebsch

(10) Patent No.: US 9,781,590 B2
(45) Date of Patent: Oct. 3, 2017

(54) PER-HOST LOCATOR TO ENABLE MOBILITY GATEWAY RELOCATION IN DISTRIBUTED MOBILITY MANAGEMENT

(75) Inventor: Marco Liebsch, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 109 days.

(21) Appl. No.: 14/353,516

(22) PCT Filed: May 14, 2012

(86) PCT No.: PCT/EP2012/058925
§ 371 (c)(1),
(2), (4) Date: Apr. 23, 2014

(87) PCT Pub. No.: WO2013/060488
PCT Pub. Date: May 2, 2013

(65) Prior Publication Data
US 2014/0307629 A1    Oct. 16, 2014

(30) Foreign Application Priority Data
Oct. 24, 2011  (EP) .................................... 11186354

(51) Int. Cl.
*H04W 8/08* (2009.01)
*H04W 36/00* (2009.01)
(Continued)

(52) U.S. Cl.
CPC ............. *H04W 8/087* (2013.01); *H04L 61/25* (2013.01); *H04W 36/0011* (2013.01); *H04W 40/34* (2013.01); *H04W 80/04* (2013.01)

(58) Field of Classification Search
None
See application file for complete search history.

(56) References Cited

U.S. PATENT DOCUMENTS

| 6,845,094 B1 | 1/2005 | Zhang |
| 9,049,570 B2 * | 6/2015 | Zhang .................... H04W 8/12 |

(Continued)

FOREIGN PATENT DOCUMENTS

WO    03/045020    5/2003

OTHER PUBLICATIONS

International Search Report dated Sep. 4, 2012, corresponding to PCT/EP2012/058925.
(Continued)

*Primary Examiner* — Rhonda Murphy
(74) *Attorney, Agent, or Firm* — Young & Thompson

(57) ABSTRACT

A method and system of relocating user equipment, such as a mobile device in a network from a first mobility anchor to a second mobility anchor, includes providing an identifier address to the user equipment when the latter is anchored to the first mobility anchor or gateway. When the user equipment is relocated to be anchored at the second mobility anchor or gateway, a per-host locator address is associated with the user equipment, the per-host locator address directing network packets to be routed to the second mobility anchor. A destination address of network packets addressed to the identifier address is translated to the per-host locator address, such that the network packets are routed to the second mobility anchor, and the destination address of network packets that are addressed to the per-host locator address are reverse translated to the identifier address, and the packets are forwarded to the user equipment.

19 Claims, 6 Drawing Sheets

(51) Int. Cl.
*H04W 40/34* (2009.01)
*H04L 29/12* (2006.01)
*H04W 80/04* (2009.01)

(56) References Cited

U.S. PATENT DOCUMENTS

2004/0058683 A1   3/2004  Okagawa et al.
2012/0044949 A1*  2/2012  Velev ................... H04W 8/082
                                                    370/401

OTHER PUBLICATIONS

M. Liebsch; Per-Host Locators for Distributed Mobility Management; Mar. 13, 2012; pp. 1-18.
Kuntz Toyota ITC D Sudhakar UCLA R Wakikawa Toyota ITC L Zhang R; A Summary of Distributed Mobility Management; No. 1; Aug. 12, 2011; pp. 1-23.
CJ Bernardos A De La Oliva UC3M F GIUST IMDEA Networks and UC3M T Melia Alcatel-Lucent: A PMIPv6-based solution for Distributed Mobility Management; No. 1; Jul. 11, 2011; pp. 1-11.
M. Buddhikot, et al.; "Mobilenat: A New Technique for Mobility Across Heterogeneous Address Spaces"; Sep. 19, 2003; pp. 75-84.

* cited by examiner

PER-HOST LOCATOR TO ENABLE MOBILITY GATEWAY RELOCATION IN DISTRIBUTED MOBILITY MANAGEMENT

CROSS-REFERENCES TO RELATED APPLICATIONS

This application is a national stage of PCT/EP2012/058925, filed May 14, 2012, which claims the benefit of priority to EP 11186354.5, filed Oct. 24, 2011, the entire contents of which are incorporated herein by reference.

FIELD OF THE INVENTION

Embodiments of the invention relate to directing network traffic from a mobile device's initial gateway to the device's current gateway.

BACKGROUND

As use of smart phones, tablets, and other Internet-enabled mobile devices increases, mobile operators are facing the tremendous challenge of coping with rapid data traffic growth stemming from bandwidth-intensive Internet services, such as video streaming. Major problems may occur in the mobile operators' aggregation and core transport network due to the common centralization of mobility gateways (mobility anchors) close to the Internet Exchange (IX) peering point(s). Mobility gateways represent the topological anchor of a mobile device's IP address and ensure forwarding of data packets to/from the mobile device's current location to any correspondent node. All traffic from and to a mobile device traverses the device's mobility gateway, from there traverses the core network.

To reduce traffic volume and associated costs in the mobile operator's core network, standards development organizations, such as the $3^{rd}$ Generation Partnership Project (3GPP) and the Internet Engineering Task Force (IETF), are working on technology to enable decentralized mobility management by means of distributed mobility gateways (DMM, Distributed Mobility Management) or Traffic Offload Functions (TOF). Distributed Gateways or Traffic Offload Functions enable cost-constrained assignment of a Gateway/TOF to a user's mobile device, since the distance and the associated routing path between a user's device and its assigned gateway/TOF can be kept short. Complete de-centralization of mobility gateways may lead to placement of gateways into the backhaul network (i.e., the portion of the network that includes the intermediate links between the core network, or backbone, and the subnetworks at the "edge" of the network) or even closer towards the edge of the network—e.g., towards the radio access for mobility devices. Such a setup potentially keeps transport costs between a mobile device and its gateway small, but may also have some drawbacks. For example, the closer the gateways are positioned to mobile devices, the more often a new gateway may need to be assigned due to the device's mobility pattern to maintain low costs communication. If the device remains anchored at the initial gateway, sub-optimal routing paths may be the result. Assignment of a new mobility gateway to a mobile device is referred to as "gateway relocation".

One problem with the assignment of a new gateway is the demand for Internet Protocol (IP) session continuity. Since the mobile device's IP address is topologically anchored at the gateway, current technology assumes that the device remains anchored over a long period of time, while it's attached to the network infrastructure. A change in the mobility gateway of a mobile device implies a change in the device's IP address, which results in a broken IP session.

Current technology for DMM solves the problem of IP session—and IP address continuity by using a forwarding tunnel from the initial gateway to the device's current gateway. That is, the messages from the core network are first sent to the device's initial gateway, and are tunneled from there to the device's current gateway. This is inefficient, and creates further bandwidth demands on the network, but has the advantage that the IP address of the mobile device remains anchored at the initial gateway, so the IP session will not be broken. Some approaches to handle DMM using such conventional technology are provided by the IETF, for example in "A Summary of Distributed Mobility Management", draft-kuntz-dmm-summary-01, of Aug. 11, 2011, and available at "http://tools.ietf.org/id/draft-kuntz-dmm-summary-01.txt". Further information can be obtained from the IETF, for example in "DMM Comparison Matrix", draft-perkins-dmm-matrix-01, of Jul. 9, 2011, available at "http://tools.ietf.org/id/draft-perkins-dmm-matrix-01.txt", or "Approaches to Distributed mobility management using Mobile IPv6 and its extensions", draft-patil-mext-dmm-approaches-01, of Jul. 12, 2011, available at "http://tools.ietf.org/id/draft-patil-mext-dmm-approaches-01.txt".

SUMMARY

Based on the above, it is an object of embodiments of the invention to provide a DMM solution that permits relocation of mobile devices (generally referred to herein as a "user equipment") from one gateway (generally referred to herein as a "mobility anchor") to another without breaking the IP session, but also without relying on the expensive routing and inefficiencies that result from tunneling. Additionally, it is an object of embodiments of the invention to achieve this without the overhead of encapsulating the packets, and without requiring major changes to the IP mobility management protocols or adding tags or other information to the data packets.

This is achieved in accordance with various embodiments of the invention, by using network address translation, and a "per-host locator", which is associated with a particular user equipment and has an address that is properly routed to the mobility anchor or gateway to which the user equipment is currently attached. This per-host locator is separate from the identifier address of the user equipment, which was assigned to the user equipment by the first mobility anchor to which it connected, and need never be communicated to the user equipment. Network packets that are addressed to the user equipment are addressed to its identifier address, which is translated at an ingress router to the per-host locator. Use of the per-host locator causes the packets to be routed to the current mobility anchor or gateway to which the user equipment is attached. Once the packets have arrived at this mobility anchor, the addresses can be reverse translated back from the per-host locator to the identifier address, and the packets may be forwarded to the user equipment. At the mobility anchor, a per-host locator allows unambiguous identification of the user equipment and its associated identifier IP address.

In one embodiment of the present invention, a method of relocating a user equipment in a network from a first mobility anchor to a second mobility anchor is provided. The method includes providing an identifier address to the user equipment when the user equipment is anchored to the first mobility anchor, and associating a per-host locator address with the user equipment when the user equipment is relocated to be anchored to the second mobility anchor. The per-host locator address directs network packets to be routed to the second mobility anchor. The method further includes translating a destination address of network packets addressed to the identifier address to the per-host locator address, such that the network packets are routed to the second mobility anchor, and reverse translating the destination address of network packets that are addressed to the per-host locator address to the identifier address, and forwarding the packets to the user equipment.

In some embodiments translating a destination address of network packets addressed to the identifier address is performed at an ingress router. In such embodiments, the method may further include providing the identifier address and the per-host locator address to the ingress router, to permit the ingress router to translate an address of network packets addressed to the identifier address to the per-host locator address. In some embodiments, reverse translating the destination address of network packets is performed by an egress router associated with the second mobility anchor. In some embodiments, the egress router is co-located with the second mobility anchor.

In some embodiments, the method includes associating an original per-host locator address with the user equipment when the user equipment is anchored to the first mobility anchor. The original per-host locator address directs network packets to be routed to the first mobility anchor. In some such embodiments, the original per-host locator address is either the same as the identifier address or a different address, which allows unambiguous identification of the user equipment and its associated identifier address.

While the per-host locator address need not be provided to the user equipment, which generally is only aware of the identifier address, in some embodiments, the per-host locator address may be provided to the user equipment. In some embodiments, the method may include sending the identifier address and the per-host locator address to a mapping server that can provide the information associating the identifier address and the per-host locator address on demand.

In some embodiments (e.g., those in which Mobile IPv6 is used), the identifier address and the per-host locator address may be IP addresses. In some other embodiments (e.g., those in which Proxy Mobile IPv6 is used), the identifier address and the per-host locator address may be IP address prefixes.

In example embodiments applying principles of the invention to 3GPP Evolved Packet Core-based networks, the first mobility anchor and the second mobility anchor may be local gateways. In some other example embodiments that apply the principles to traffic offload function mobility in a 3GPP Universal Mobile Telecommunication System (UMTS)-based network, the first mobility anchor and the second mobility anchor may be traffic offload functions.

In some embodiments, once there is no further need to use the identifier address of the user equipment, the network configures the per-host locator address as a new identifier address of the user equipment. This can occur, for example, when all of the network connections on the user equipment are closed, such that changing the new identifier address of the user equipment to the per-host locator address will not disrupt on-going sessions or communication.

In a further embodiment, a network system for distributed mobility management is provided. The network system includes a user equipment configured to receive network packets through the network, a first mobility anchor configured to assign an identifier address to the user equipment when the user equipment is anchored to the first mobility anchor, and a second mobility anchor configured to associate a per-host locator address with the user equipment when the user equipment is relocated to be anchored to the second mobility anchor. The per-host locator address directs network packets to be routed to the second mobility anchor. The network system also includes an ingress router configured to translate a destination address of network packets addressed to the identifier address to the per-host locator address, such that the network packets are routed to the second mobility anchor, and an egress router associated with the second mobility anchor, the egress router configured to reverse translate the destination address of network packets that are addressed to the per-host locator address to the identifier address, and forward the packets to the user equipment.

In some embodiments, the second mobility anchor is further configured to provide the identifier address and the per-host locator address to the ingress router. In some embodiments, the network system further includes a mapping server that can provide the information associating the identifier address and the per-host locator address on demand, and the second mobility anchor is configured to provide the identifier address and the per-host locator address to the mapping server. In some embodiments, routing protocols may be used to establish and update address mappings at the ingress routers and/or the mapping server.

In some embodiments of the network system (e.g., those in which Mobile IPv6 is used), the identifier address and the per-host locator address may be IP addresses. In some other embodiments of the network system (e.g., those in which Proxy Mobile IPv6 is used), the identifier address and the per-host locator address may be IP address prefixes.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1A:
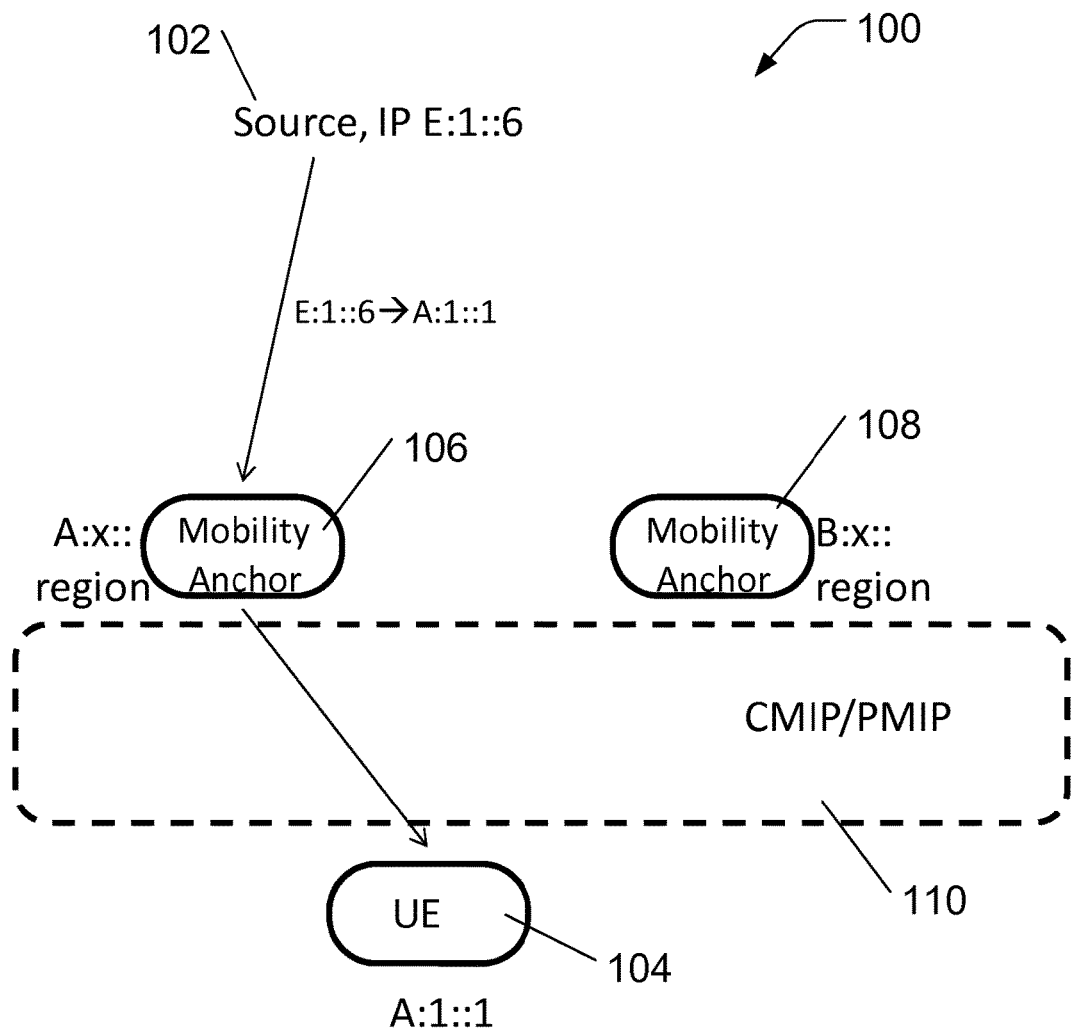
FIGS. 1A and 1B show the nature of a problem with gateway or mobility anchor relocation.
Figure 1B:
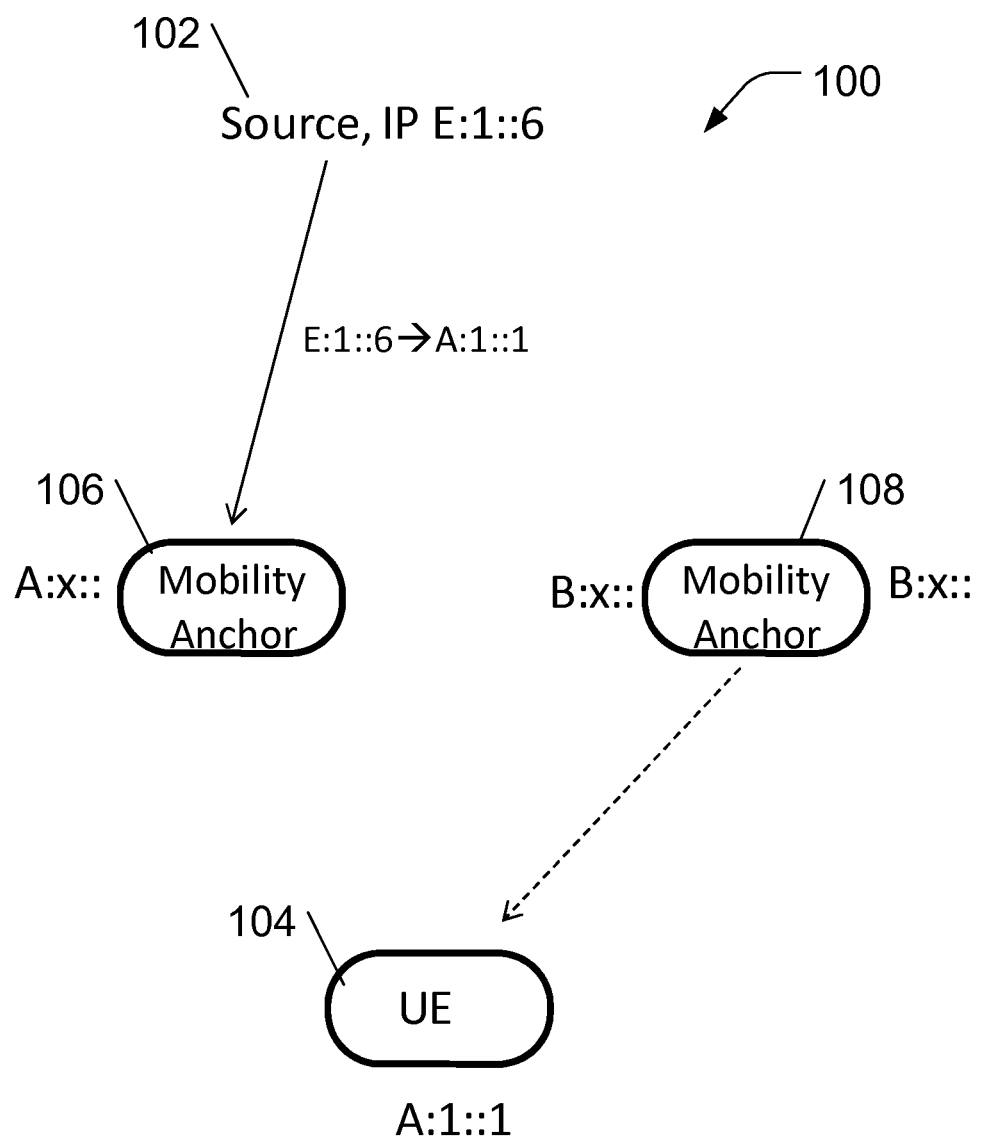

Referring to FIGS. 1A-1B, a problem with gateway or mobility anchor relocation is described. In FIG. 1A, the network 100 includes a source 102 having an IP address E:1::6 (a [prefix]::[suffix] notation will be used herein for IP addresses). The source 102 is attempting to send packets to the IP address of user equipment (UE) 104, such as a smart phone, tablet, or other mobile device. The UE 104 has an IP address A:1::1, which has been assigned and anchored at a first mobility anchor 106. All addresses in the A:x::region (e.g., including A:1::1) are routed to the first mobility anchor 106, which forwards them to the UE 104. A second mobility anchor 108 is also present on the network, and all addresses in the B:x::region are routed to the second mobility anchor 108. The network also includes a conventional client mobile IP (CMIP) or proxy mobile IP (PMIP) plane 110 for mobility management, that manages communication between the first and second mobility anchors 106 and 108 and mobile UEs, such as the UE 104. The CMIP/PMIP plane will not be shown in later figures, but is generally still present.

FIG. 1B shows a difficulty with routing downlink packets addressed UE 104 when the UE 104 has been handed over to the second mobility anchor 108. This handover could happen for any of a number of reasons. For example, as the mobility anchors are moved closer to the edges of networks in order to better handle ever-increasing bandwidth demands, it is possible that due to its mobility, the UE 104 is receiving a much stronger signal from portions of the network associated with the second mobility anchor 108 than with the first mobility anchor 106. Assuming that the UE 104 is relocated to the second mobility anchor 108, there are a number of ways that this relocation could be handled. For example, the UE 104 could be assigned a new IP address that is in the range of IP addresses that are routed to the second mobility anchor 108. Of course, doing this would have the undesirable effect of breaking any ongoing IP sessions with the UE 104.

FIG. 1B shows another attempted solution, in which the IP Address of the UE 104 (A:1::1) is anchored at the second mobility anchor 108 after the handover of the UE 104 from being anchored at the first mobility anchor 106 to being anchored at the second mobility anchor 108. Of course, this arrangement is topologically incorrect, and as shown in FIG. 1B, the network's routers are still routing packets destined for the UE 104 and addressing the UE's (104) IP address (A:1::1) to the first mobility anchor 106, to which the UE 104 is no longer anchored. To address this problem, the routing plane (not shown) above the first and second mobility anchors would need to route downlink packets destined for A:1::1 to the second mobility anchor 108.

Figure 2:
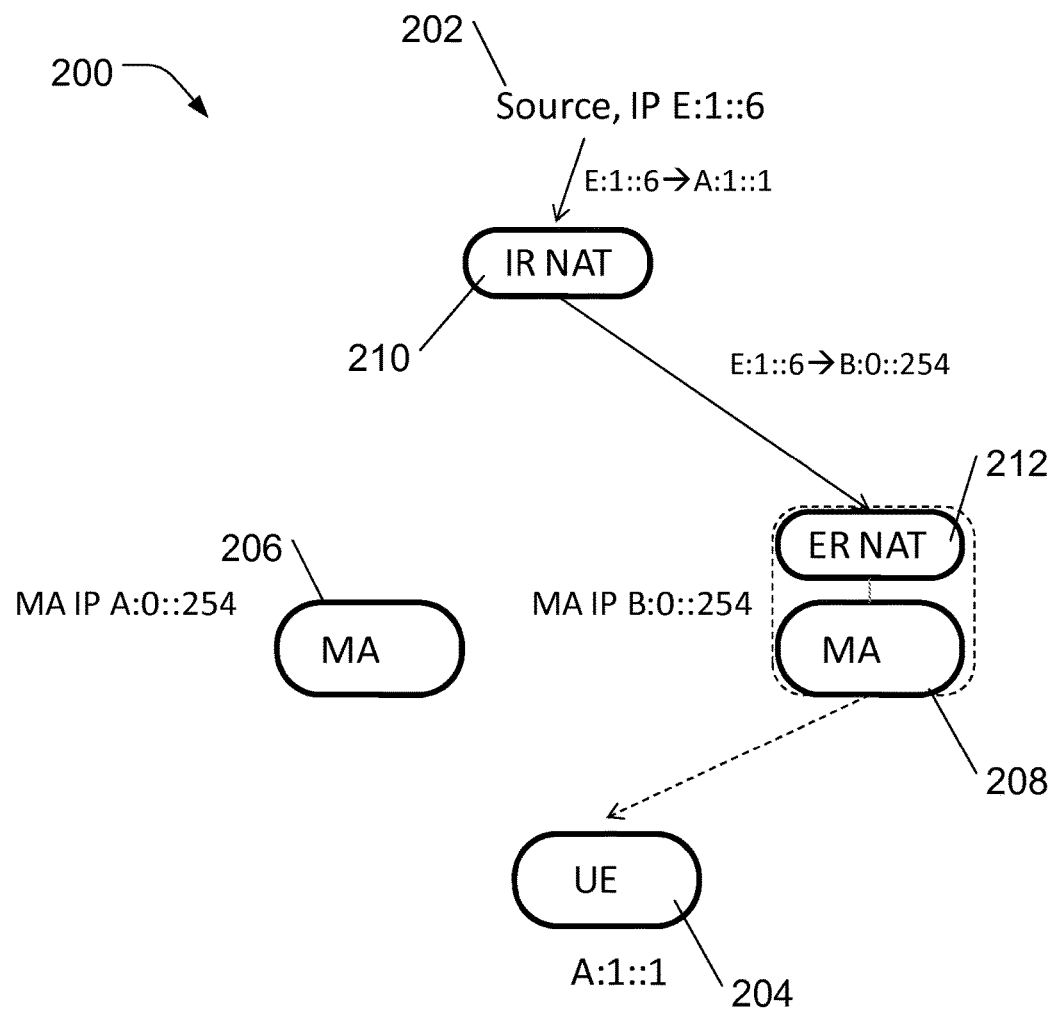
FIG. 2 shows an approach to solving the problem demonstrated by FIGS. 1A and 1B using Network Address Translation (NAT) at an ingress router (IR), that also has difficulties due to the need to reverse NAT the addresses at the egress router (ER)

FIG. 2 shows such an approach, in which the UE or mobile device's IP address is translated into the address of the gateway or mobility anchor to which it is anchored. This allows the packets destined to the UE to be sent to the correct mobility anchor, but does not allow the mobility anchor to send the packets to the proper UE, since the packets do not carry the necessary information to permit correct identification of the UE and reverse network address translation to the original IP address of the UE (A:1::1) at the UE's current gateway or mobility anchor. As shown in FIG. 2, a network 200 includes a source 202, having an IP address, as before, of E:1::6. The source 202 is attempting to send packets to the IP address A:1::1 of a UE 204, such as a smart phone, tablet, or other mobile device. The UE 204 was originally anchored at a first mobility anchor 206, which assigned it its IP address, but has now been relocated to be anchored at a second mobility anchor 208. The network also includes an ingress network address translation (NAT) router 210, which has been advised by the network 200 that the IP address A:1::1 is now anchored at the second mobility anchor 208. Accordingly, the ingress NAT router translates the address A:1::1 to a locator address corresponding to the address of the proper mobility anchor to which to send the packet—in this case, the address of the second mobility anchor 208, B:0::254, which is then routed by the network 200 to the second mobility anchor 208.

An egress NAT router 212, which may be part of or closely connected to the second mobility anchor 208 would then need to perform a reverse network address translation to send the packet to its original destination—the UE 204. Unfortunately, because the packets underwent a network address translation at the ingress NAT router 210, the packets no longer carry an identifier to allow reverse network address translation from the address of the second mobility anchor 208 to the UE 204.

This method can be briefly summarized as using two network address translations—one on the ingress NAT router 210, and one on the egress NAT router 212. It should be noted that the ingress router 210 may be a border router, or in some embodiments, may be located, e.g., at a mobility anchor, such as the first mobility anchor 206. The ingress router may also be one out of multiple ingress routers being distributed throughout the network's (200) routing plane. The egress NAT router 212 may be co-located with a mobility anchor, such as the second mobility anchor 208. The ingress NAT router 210 translates the IP address of the UE 204 (referred to as the "identifier IP address") in downlink packets (i.e., packets destined to the UE 204) to the address of the mobility anchor to which the UE 204 is anchored (referred to as the "locator IP address"), so that the packets may be correctly routed to the proper mobility anchor. Using network address translation for this has the advantage of avoiding encapsulation overhead that would occur were the packets encapsulated to maintain their original destination information. Unfortunately, it has the problem that the packets do not carry the necessary information to identify the UE (204) and permit reverse network address translation of the locator IP address to the identifier IP address at the egress NAT router 212.

This problem is solved in accordance with an embodiment of the invention, in which after the UE or mobile device is assigned to a new mobility anchor or gateway, the new mobility anchor also assigns a new IP address to the UE, such as when the mobile device uses the gateway for its initial attachment. This new IP address represents a routable IP address to the new mobility anchor, but is used solely as routable locator (referred to herein as a "per-host locator"). The IP address that was initially assigned to the user's device will be treated solely as an identifier for the communication. The per-host locator is not communicated to the user's device and is intrinsically overloaded to carry both locator (i.e., the mobility anchor to which packets should be routed) and identifier (i.e., the UE at that mobility anchor) information. It should also be noted that although the per-host locator may be assigned by the mobile device's current mobility anchor, other components, such as a DHCP server, may assign the per-host locator.

Thus, in accordance with various embodiments of the invention, mobility anchors maintain two IP addresses for UEs or mobile devices: the initially assigned IP address (from the initial mobility anchor), which serves as identifier after mobility anchor relocation; and the per-host locator. Contrary to the assigned IP address at initial attachment and registration with a mobility anchor, the per-host locator is not communicated to the mobile device; hence, the user's device keeps on handling and using only a single IP address for communication.

This overloading of the locator to effectively carry both locator and identifier address information enables reverse network address translation (reverse NAT) at the egress router, even though the original identifier address is not retained in the packets during network address translation (NAT) at the ingress router. It also avoids introducing additional overhead in the protocol headers to carry identifier keys or other information to enable such reverse NAT.

In accordance with various embodiments of the invention, a per-host state is maintained on the ingress NAT router after mobility anchor relocation. The state includes the UE's initially assigned IP address (identifier) and the current per-host locator of the mobile device.

Different approaches can be used to establish the state on the ingress NAT router. After mobility anchor relocation, a fast establishment of the state on the ingress NAT router is preferable, to support a smooth handover. Handover performance can be improved through interconnection of the technology for updating the ingress NAT router per-host locator and the mobility anchor relocation and handover procedure.

For example, establishing the NAT state on the ingress NAT router can be based on proactive establishment by the mobility anchors (i.e., states are established or updated by the mobility anchors). Alternatively, a mapping system that holds the information about the mapping between an identifier and per-host locator can be used. For example, ingress NAT routers could request that the mapping system resolves the user's IP address into the per-host locator. Another example is to use routing protocols to establish and update per-host states in ingress routers and/or the mapping system, which are distributed in the network's routing plane.

The methods and system of various embodiments of the invention permit optimal or near-optimal routes to be maintained in Distributed Mobility Management even after mobility gateway relocation. Per-packet encapsulation overhead is avoided through use of address translation. Additionally a standard address assignment as performed by a mobility anchor or gateway can be used to build the per-host locator. Use of the methods has no impact on the IP mobility protocol being used below the anchors or gateways, and no impact on core network routers and the transport network.

Advantageously, use of the methods of various embodiments of the present invention avoids encapsulation overhead while properly forwarding network traffic to the UE's locator, and allows the UE to use a single IP address. This is done without introducing additional protocol header overhead to carry identifier information, such as a label, key, etc. Additionally, no extra functionality is needed to interpret new identifier labels on the routing locator/mobility anchor.

Figure 3:
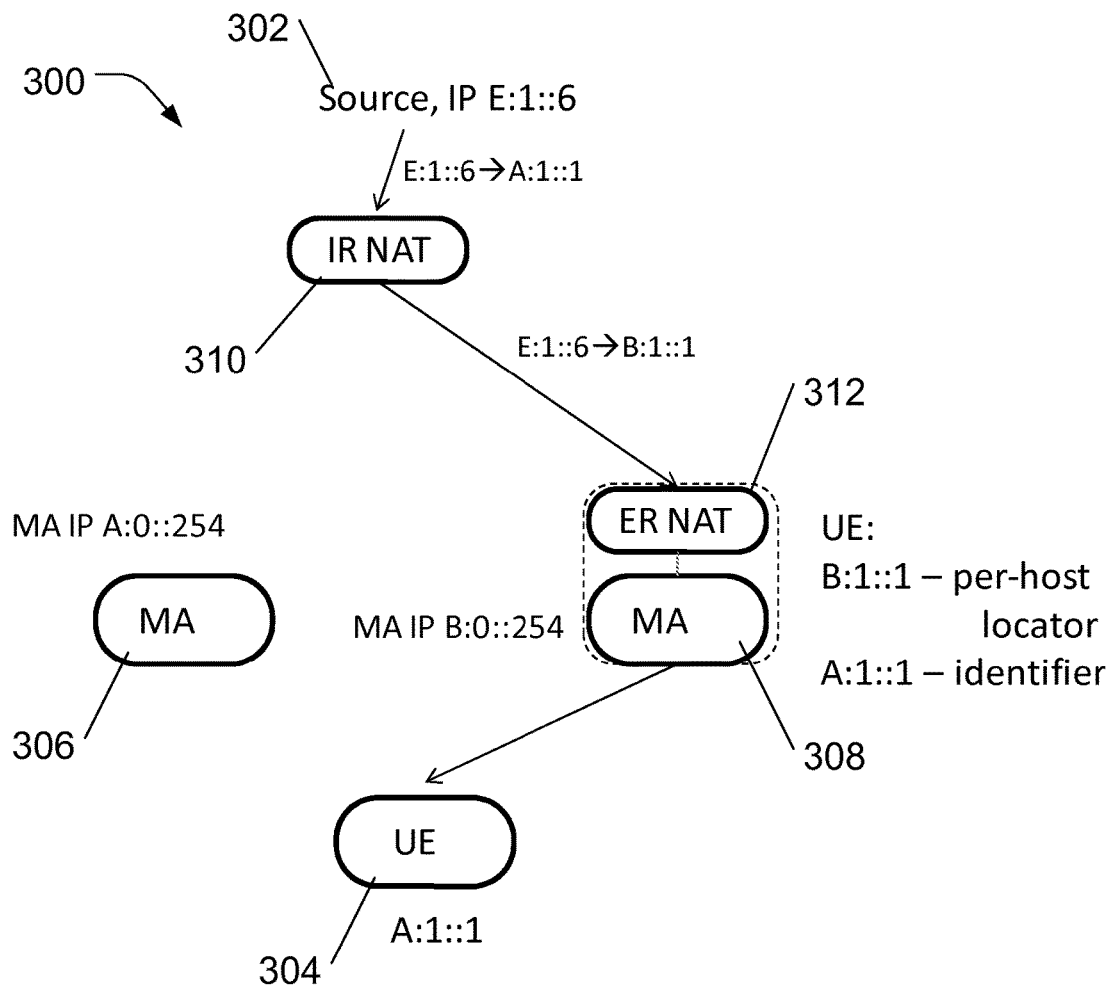
FIG. 3 shows an embodiment in accordance with the invention, in which a per-host locator address is used.

FIG. 3 shows an example network 300 in which traffic from a source 302 is routed to a UE 304 after anchor relocation, in accordance with an embodiment of the invention. The network 300 includes a source 302, having an IP address, as before, of E:1::6. The source 302 is attempting to send packets to the IP address A:1::1 of a UE 304, such as a smart phone, tablet, or other mobile device. The UE 304 was originally anchored at a first mobility anchor 306, which assigned it its IP address (identifier) of A:1::1, but has now been relocated to be anchored at a second mobility anchor 308. In accordance with an embodiment of the invention, the second mobility anchor 308, has assigned a per-host locator of B:1::1 to the UE 304, and communicated that locator to an ingress NAT router 310. The per-host locator has not been communicated to the UE 304, which continues to use the identifier address A:1::1 that was assigned to it by its original mobility anchor (i.e., the first mobility anchor 306), reducing the risk of a broken IP session.

The ingress NAT router 310 translates addresses of packets directed to A:1::1 to be sent instead to B:1::1. Since the second mobility anchor 308 handles packets in the B:x:: region, the packet to B:1::1 is routed to the second mobility anchor 308, which has an address of B:0::254.

An egress NAT router 312, which is associated with the second mobility anchor 308 receives the packet destined to B:1::1, identifies the UE 304 according to its per-host locator address and performs a reverse network address translation to translate the destination address to A:1::1. The packet is then successfully sent to the UE 304. It should be noted that in some embodiments, the egress NAT router 312 may be co-located with the second mobility anchor 308, but this need not always be the case. In general, the egress NAT router 312 may be located on a different network entity, which shares the same network as the second mobility anchor 308. In such a setup, e.g., a link-layer mechanism can be used to convey packets from the egress NAT router 312 to the second mobility anchor 308, even though the packet addresses the identifier address. Such link-layer mechanisms may include switching technology that does not rely solely on IP addresses.

In summary, this per-host locator approach does not use the address of the second mobility anchor 308 as a common locator, as in the example discussed above with reference to FIG. 2. Instead, the second mobility anchor 308 assigns a new specific locator to the UE 304—a "per-host locator". This per-host locator is maintained in addition to the original IP address of the UE 304, which continues to be used as an identifier for the UE 304. Indeed, the per-host locator need not be communicated to the UE 304, which may be completely unaware of being relocated between mobility anchors, and may continue its IP sessions without interruption due to such relocation.

The mobility anchors, or egress NAT routers associated with the mobility anchors maintain two addresses for UEs—a per-host identifier, and a per-host locator. The per-host identifier and per-host locator can be the same for the first mobility anchor to which a UE is anchored, since that mobility anchor assigns the UE an identifier from its own address pool, so the identifier address is also a routable locator. When mobility anchor relocation occurs, then the new mobility anchor assigns a new routable per-host locator, but the identifier remains the same. As explained above, this new per-host locator need not be communicated to the UE. Optionally, in some embodiments, a locator that is different from the identifier can be assigned at the first attachment— i.e., by the first mobility anchor to which a UE is connected. Also, in some embodiments, the per-host locator may optionally be communicated to the UE, so that both addresses are present on the UE.

In some embodiments, the NAT per-host locator may be built according to standard address delegation/assignment mechanisms of, e.g., Mobile IPv6 (MIPv6), or Proxy Mobile IPv6 (PMIPv6). For example, in an MIPv6/PMIPv6-based system, the second mobility anchor 308 may assign a new home network prefix or IP home address respectively to the UE as a per-host locator after handover.

It should also be noted that in some embodiments, once there is no longer a need to continue using the original identifier address of the UE (e.g., when all data sessions have terminated), the UE and the network can configure a per-host locator address of the UE's current anchor to be a new identifier address. At this point, the current anchor takes the place of the initial anchor, and the process described above can be used when the UE is moved to another mobility anchor.

Figure 4:
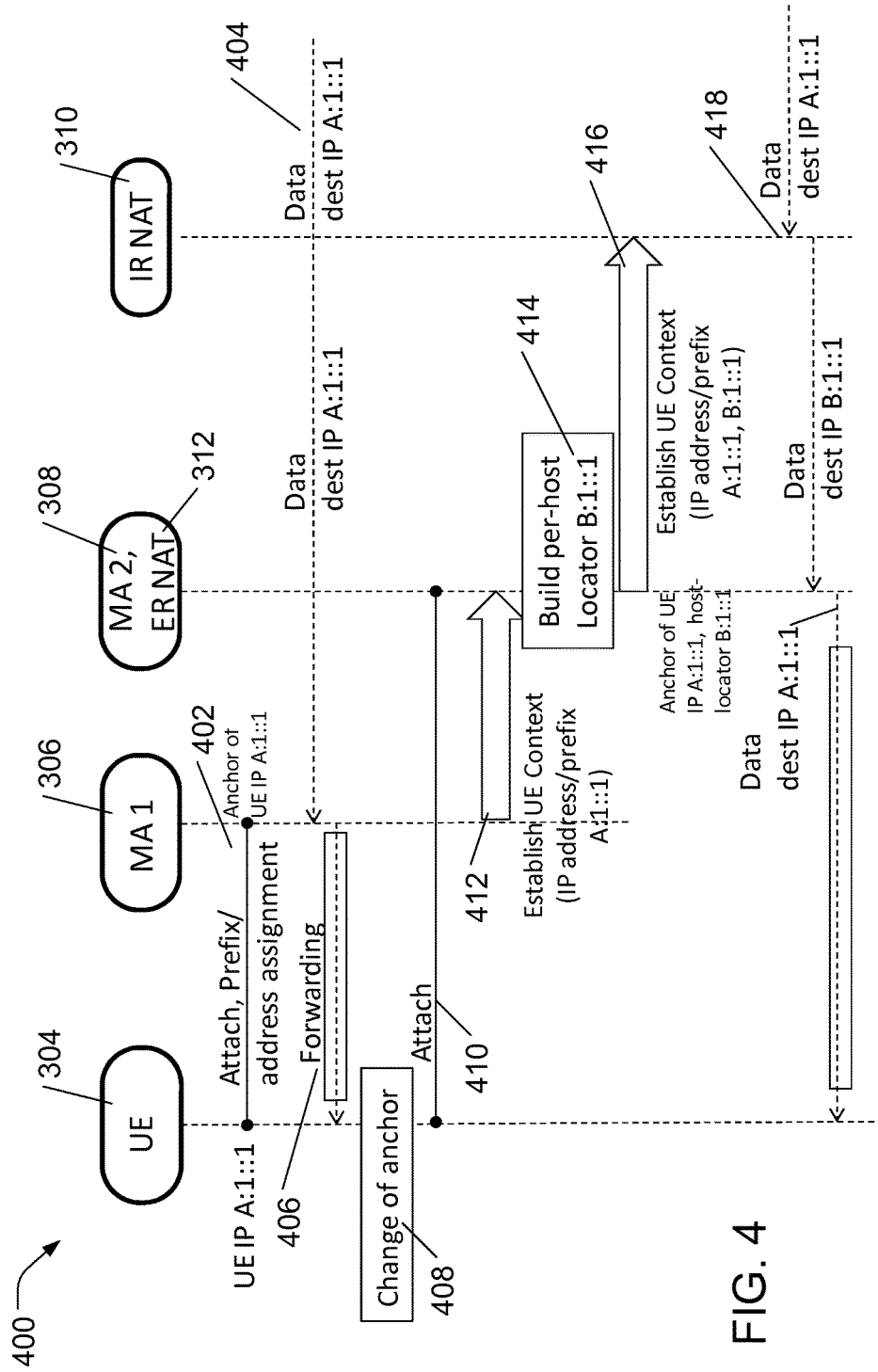
FIG. 4 shows a method for establishing the per-host locator NAT states at a mobility anchor or gateway and at an ingress router.

Referring now to FIG. 4, an example procedure 400 is described for establishing the per-host locator NAT states at the component implementing the new mobility anchor after relocation (e.g., the second mobility anchor 308 of FIG. 3) and egress NAT router, as well as at the component implementing the ingress NAT router. At 402, after initial attachment, the UE 304 is assigned an initial anchor, such as first mobility anchor 306 and an IP address (e.g., if Mobile IPv6 is used as the mobility management protocol between the mobility anchors and the UE) or an IP address prefix (e.g., if Proxy Mobile IPv6 is being used as the mobility management protocol between the mobility anchors and the UE). This IP address or IP address prefix will serve as the identifier of the UE 304.

At 404, services and correspondent nodes (not shown) can address the UE 304 by means of its IP address A:1::1. At 406, packets are routed by the mobile operator network to the current mobility anchor (i.e., the first mobility anchor 306) to which the UE 304 is anchored. The current mobility anchor forwards the packets towards the UE 304 according to the mobility management protocol currently in use, e.g. by using a forwarding tunnel.

At 408, a change of anchor occurs, and at 410, the UE 304 attaches to a new mobility anchor, such as the second mobility anchor 308, moving the UE 304 from the first mobility anchor 306 to the second mobility anchor 308. At 412, the new mobility anchor (i.e., the second mobility anchor 308) learns about the initially assigned IP address or address prefix of the UE 304 (i.e., the identifier of the UE 304). The information can for example be transferred to the new mobility anchor (i.e., the second mobility anchor 308) by the previous mobility anchor (i.e., the first mobility anchor 306).

At 414, the new mobility anchor (i.e., second mobility anchor 308) builds a new IP address or IP address prefix for the UE 304 according to the mobility management protocol that is in use. This new IP address or IP address prefix is used as a per-host locator.

At 416, the binding between the identifier IP address (A:1::1) or identifier IP address prefix (A:1::) of the UE 304 and the per-host locator IP address or per-host locator IP address prefix of the UE 304 is provided to one or multiple ingress NAT routers 310. The state for the UE 304 at the ingress NAT router(s) 310 can either be either established by the new mobility anchor (i.e., second mobility anchor 308) or alternative mechanisms, such as routing protocols. Alternatively or in addition, the binding can be stored in a mapping server (not shown) to make the mapping between the identifier IP address (or prefix) of the UE 304 and the per-host locator IP address (or prefix) of the UE 304 available for other ingress NAT routers at a later point in time. The mapping service can be used by ingress NAT routers that do not have a per-host locator IP address registered but need to forward data to the correct mobility anchor for the UE 304.

At 418, after the state for the UE 304 has been established at the ingress NAT router(s) 310, data packets towards the UE 304 can be NATed at the ingress NAT router(s) 310 to enable routing to the UE's current mobility anchor (i.e., second mobility anchor 308). An egress NAT router 312 associated with the current mobility anchor reverse NATs the destination address into the UE's identifier IP address.

It should be noted that the mapping between a per-host locator IP address and the UE's identifier IP address can also be established at the initial attachment at the first mobility anchor 306. In such case, the first mobility anchor 306 can build a per-host locator in addition to the UE identifier IP address and provide the binding to ingress NAT router(s) 310 and/or mapping services.

Embodiments of the invention can also be applied in other technological contexts, such as 3GPP Evolved Packet Core (EPC) and 3GPP Universal Mobile Telecommunication Systems (UMTS). For 3GPP EPC, the set-up of the system is similar to that shown above in FIG. 3, with local gateways (L-GW) serving as mobility anchors, and embodiments of the present invention can be used to provide per-host locators for moving a UE from one L-GW to another in the context of distributed/dynamic mobility management (DMM). In some embodiments, L-GWs can have the egress NAT routers co-located with the L-GWs, similar to co-locating the egress NAT routers and mobility anchors as shown in FIG. 3.

Embodiments of the present invention applied to 3GPP UMTS are more complex, but can be used to permit traffic offload function (TOF) relocation. For the UMTS architecture, Gateway GPRS Support Nodes (GGSN) serve as a UE's mobility anchor. UMTS does not contemplate distribution of GGSNs, but specifies offloading of traffic below the UE's GGSN by means of Traffic Offload Functions (TOF). A TOF works as tapping device, and intercepts packets sent by the UE for offloading from the forwarding tunnel (GTP tunnel). To provide for downlink packets of the same IP session being sent to the UE to arrive at the associated TOF for further forwarding to the UE in the GTP tunnel, the TOF includes a NAT, which translates the uplink packets being sent by the UE. The NATed address serves as a UE identifier IP address for the offloaded data traffic and is visible to correspondent nodes. Traffic sources sending packets to the UE use the UE's NATed IP address as identifier, which is a routable IP address prior to TOF relocation (i.e., relocating the UE from a first TOF to a second TOF). TOF relocation is not yet a part of the 3GPP UMTS standards, but could be implemented using the per-host locators of various embodiments of the present invention to maintain IP sessions and to support continuity of the UE's identifier IP address for offloaded traffic, even after TOF relocation.

Figure 5:
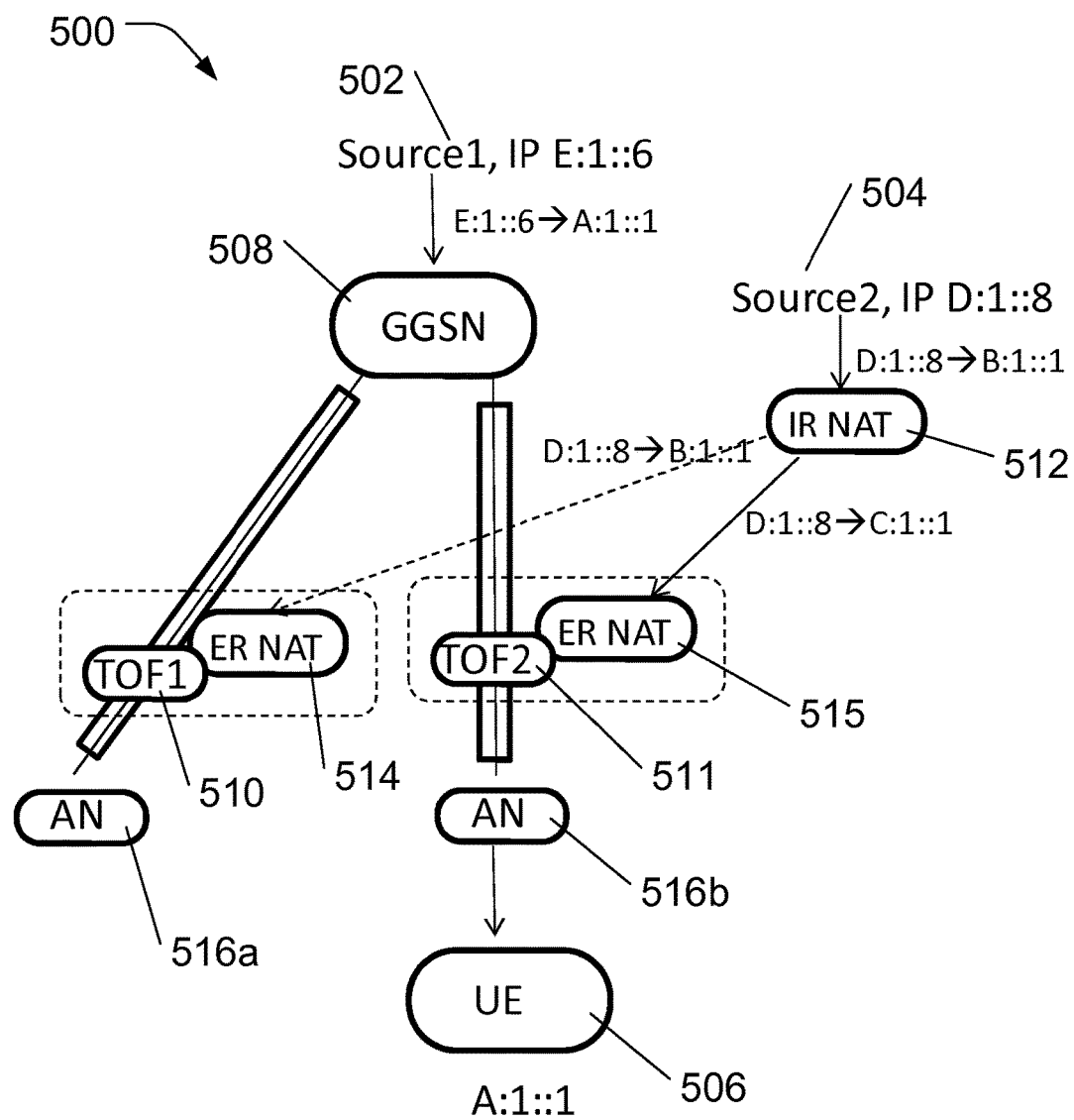
FIG. 5 shows an example embodiment applied to traffic offload function relocation in a 3GPP Universal Mobile Telecommunication System (UMTS)-based network.

An example of an embodiment of the present invention being used for TOF relocation in a UMTS architecture is shown in FIG. 5. As shown in FIG. 5, a TOF-enabled UMTS network 500 includes a first source 502 (having an address of E:1::6) and a second source 504 (having an address of D:1::8), both of which are sending packets to a UE 506. The UE 506 has an address of A:1::1 when accessed through a GGSN 508.

In order to, e.g., avoid too much traffic through the GGSN 508 or to provide better routing for some traffic than sending it through the GGSN 508, some traffic (in this example, the traffic from the second source 504) is being handled through a TOF in the network. With respect to such "offloaded" or "breakout" traffic, the UE 506 has an address (identifier) of B:1::1, which will be referred to herein as a breakout identifier. This breakout identifier was assigned to the UE 506 by a first TOF 510, with which the UE 506 was originally associated. The first TOF 510 built a local breakout identifier (B:1::1) for the UE's breakout traffic, similar to the initial mobility anchor in the examples described above. An ingress NAT router 512 routes the breakout traffic to the appropriate TOF. Prior to TOF relocation, this means that packets from the second source 504 will be sent to B:1::1, and will be sent to the first TOF 510, as shown by the dotted line in FIG. 5, where a first egress NAT router 514 handles NATing between A:1::1 and B:1::1, so that the breakout packets are appropriately sent to/from the UE 506.

After TOF relocation, the UE 506 is associated with a second TOF 511, with an associated second egress NAT router 515. In accordance with an embodiment of the invention, the second TOF 511 builds a per-host locator for the breakout traffic of C:1::1. The second egress NAT router 515 translates between the per-host locator for breakout traffic (C:1::1), the breakout traffic identifier (B:1::1), and (ultimately), the UE'S address of A:1::1. The ingress NAT router 512 is also made aware of the per-host locator for the breakout traffic, so it can properly translate the address of breakout traffic bound for the UE (B:1::1) to the second TOF 511, using the per-host locator (C:1::1) assigned by the second TOF 511.

For traffic being sent from the first source 502 to the UE 506, along the "normal" route through the GGSN 508, the traffic is addressed to A:1::1, and is forwarded to the UE 506 through the "usual" UMTS architecture—i.e. through the appropriate Access Network Node (AN) 516a, 516b. Traffic being sent from the second source 504 to the UE 506 represents breakout traffic, and is addressed to the breakout identifier address originally assigned by the first TOF 510—B:1::1. The ingress NAT router 512 NATs this address to the per-host locator for the second TOF 511—C:1::1, so the packets will be routed to the second TOF 511. The second egress NAT router 515, associated with the second TOF 511, in turn ultimately reverse NATs the address of the packets (to B:1::1, per the breakout identifier, and then according to the TOF to A:1::1) to direct them to the UE 506.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of relocating a user equipment in a network from a first mobility anchor to a second mobility anchor, the method comprising:
   providing an identifier address to the user equipment when the user equipment is anchored to the first mobility anchor, the identifier address belonging to an address region of which all addresses are routed to the first mobility anchor, which forwards the addresses to the user equipment;
   associating a per-host locator address with the user equipment when the user equipment is relocated to be anchored to the second mobility anchor, the per-host locator address directing network packets to be routed to the second mobility anchor;
   translating a destination address of network packets addressed to the identifier address to the per-host locator address, such that the network packets are routed to the second mobility anchor, the translating being performed at an ingress router, the identifier address and the per-host locator address being provided to the ingress router to permit the ingress router to translate an address of network packets addressed to the identifier address to the per-host locator address; and
   reverse translating the destination address of network packets that are addressed to the per-host locator address to the identifier address, and forwarding the packets to the user equipment.

2. The method of claim 1, wherein reverse translating the destination address of network packets is performed by an egress router associated with the second mobility anchor.

3. The method of claim 2, wherein the egress router is co-located with the second mobility anchor.

4. The method of claim 1, further comprising associating an original per-host locator address with the user equipment when the user equipment is anchored to the first mobility anchor, the original per-host locator address directing network packets to be routed to the first mobility anchor.

5. The method of claim 4, wherein the identifier address is the same as the original per-host locator address.

6. The method of claim 1, further comprising providing the per-host locator address to the user equipment.

7. The method of claim 1, further comprising sending the identifier address and the per-host locator address to a mapping server that can provide the information associating the identifier address and the per-host locator address on demand.

8. The method of claim 1, wherein the identifier address and the per-host locator address comprise IP addresses.

9. The method of claim 1, wherein the identifier address and the per-host locator address comprise IP address prefixes.

10. The method of claim 1, wherein the first mobility anchor and the second mobility anchor comprise local gateways in a 3GPP Evolved Packet Core-based network.

11. The method of claim 1, wherein the first mobility anchor and the second mobility anchor comprise Traffic Offload Functions in a 3GPP Universal Mobile Telecommunication System-based network.

12. The method of claim 1, wherein once there is no further need to use the identifier address of the user equipment, the network configures the per-host locator address as a new identifier address of the user equipment.

13. A network system for distributed mobility management comprising:
   a user equipment configured to receive network packets through the network;
   a first mobility anchor configured to assign an identifier address to the user equipment when the user equipment is anchored to the first mobility anchor, the identifier address belonging to an address region of which all addresses are routed to the first mobility anchor, which forwards the addresses to the user equipment;
   a second mobility anchor configured to associate a per-host locator address with the user equipment when the user equipment is relocated to be anchored to the second mobility anchor, the per-host locator address directing network packets to be routed to the second mobility anchor;
   an ingress router provided with the identifier address and the per-host locator address and configured to translate a destination address of network packets addressed to the identifier address to the per-host locator address, such that the network packets are routed to the second mobility anchor; and
   an egress router associated with the second mobility anchor, the egress router configured to reverse translate the destination address of network packets that are addressed to the per-host locator address to the identifier address, and forward the packets to the user equipment.

14. The network system of claim 13, wherein the second mobility anchor is further configured to provide the identifier address and the per-host locator address to the ingress router.

15. The network system of claim 13, further comprising a mapping server that can provide the information associating the identifier address and the per-host locator address on demand, and wherein the second mobility anchor is configured to provide the identifier address and the per-host locator address to the mapping server.

16. The network system of claim 15, wherein routing protocols are used to establish and update address mappings at the mapping server.

17. The network system of claim 13, wherein routing protocols are used to establish and update address mappings at the ingress router.

18. The network system of claim 13, wherein the identifier address and the per-host locator address comprise IP addresses.

19. The network system of claim 13, wherein the identifier address and the per-host locator address comprise IP address prefixes.

* * * * *